US010832127B2

(12) United States Patent
Cao et al.

(10) Patent No.: US 10,832,127 B2
(45) Date of Patent: Nov. 10, 2020

(54) THREE-DIMENSIONAL INTEGRATION OF NEUROSYNAPTIC CHIPS

(71) Applicant: International Business Machines Corporation, Armonk, NY (US)

(72) Inventors: Qing Cao, Yorktown Heights, NY (US); Kangguo Cheng, Schenectady, NY (US); Zhengwen Li, Scarsdale, NY (US); Fei Liu, Yorktown Heights, NY (US)

(73) Assignee: Samsung Electronics Co., Ltd., Suwon (KR)

( * ) Notice: Subject to any disclaimer, the term of this patent is extended or adjusted under 35 U.S.C. 154(b) by 660 days.

(21) Appl. No.: 14/953,585

(22) Filed: Nov. 30, 2015

(65) Prior Publication Data
US 2017/0154257 A1 Jun. 1, 2017

(51) Int. Cl.
*G06N 3/063* (2006.01)
*G06N 3/04* (2006.01)
*G06N 3/08* (2006.01)

(52) U.S. Cl.
CPC ............ *G06N 3/0635* (2013.01); *G06N 3/04* (2013.01); *G06N 3/049* (2013.01); *G06N 3/08* (2013.01)

(58) Field of Classification Search
CPC ........ G06N 3/0635; G06N 3/04; G06N 3/049; G06N 3/08
See application file for complete search history.

(56) References Cited

U.S. PATENT DOCUMENTS

| 8,253,443 | B2 | 8/2012 | Robinett |
| 8,373,440 | B2 | 2/2013 | Strukov et al. |
| 8,447,714 | B2 | 5/2013 | Breitwisch et al. |
| 8,510,239 | B2 | 8/2013 | Modha |
| 8,648,327 | B2 | 2/2014 | Herner |
| 8,990,130 | B2 | 3/2015 | Alvarez-Icaza Rivera et al. |
| 2009/0313195 | A1 | 12/2009 | McDaid et al. |
| 2010/0241601 | A1* | 9/2010 | Carson ............... G06N 3/02 706/27 |

(Continued)

FOREIGN PATENT DOCUMENTS

| CN | 102270504 A | 12/2011 |
| CN | 104701309 A | 6/2015 |
| WO | PCT/IB2016/057027 | 3/2017 |

OTHER PUBLICATIONS

Clermidy et al., "Advanced Technologies for Brain-Inspired Computing", 19th Asia and South Pacific Design Automation Conference (ASP-DAC), Jan. 20-23, 2014 (Year: 2014).*

(Continued)

*Primary Examiner* — Robert A Cassity
*Assistant Examiner* — Tsu-Chang Lee
(74) *Attorney, Agent, or Firm* — NSIP Law

(57) ABSTRACT

A three-dimensional integration of synapse circuitry is formed. One or more neuron layers each comprises a plurality of computing elements, and one or more synapse layers each comprising an array of memory elements are formed on top of the one or more neuron layers. A plurality of staggered through-silicon vias (TSVs) connect the one or more neuron layers to the one or more synapse layers and operate as communication links between one or more computing elements in the one or more neuron layers and one or more memory elements in the one or more synapse layers.

20 Claims, 3 Drawing Sheets

(56) References Cited

U.S. PATENT DOCUMENTS

| | | | |
|---|---|---|---|
| 2011/0292742 A1 | 12/2011 | Oh et al. | |
| 2012/0162947 A1* | 6/2012 | O'Donnell | H01L 25/16 |
| | | | 361/783 |
| 2012/0250443 A1 | 10/2012 | Saraswat et al. | |
| 2013/0307160 A1* | 11/2013 | Farooq | H01L 25/0657 |
| | | | 257/774 |
| 2014/0310490 A1* | 10/2014 | Vogt | G06F 3/0604 |
| | | | 711/162 |

OTHER PUBLICATIONS

D. Kuzum et al., "Energy Efficient Programming of Nanoelectronic Synaptic Devices for Large-Scale Implementation of Associative and Temporal Sequence Learning," IEEE International Electron Devices Meeting (IEDM), Dec. 2011, pp. 30.3.1-30.3.4.

P. Merolla et al., "A Digital Neurosynaptic Core Using Embedded Crossbar Memory with 45pJ per Spike in 45nm," IEEE Custom Integrated Circuits Conference (CICC), Sep. 2011, 4 pages.

P.A. Merolla et al., "A Million Spiking-Neuron Integrated Circuit with a Scalable Communication Network and Interface," Science, Aug. 2014, pp. 668-673, vol. 345, No. 6197.

J.-S. Seo et al., "A 45nm CMOS Neuromorphic Chip with a Scalable Architecture for Learning in Networks of Spiking Neurons," IEEE Custom Integrated Circuits Conference (CICC), Sep. 2011, 4 pages.

M. Suri et al., "Phase Change Memory as Synapse for Ultra-Dense Neuromorphic Systems: Application to Complex Visual Pattern Extraction," IEEE International Electron Devices Meeting (IEDM), Dec. 2011, pp. 4.4.1-4.4.4.

* cited by examiner

100

200

200'

300

300'

THREE-DIMENSIONAL INTEGRATION OF NEUROSYNAPTIC CHIPS

BACKGROUND

In the brain, neurons communicate through binary messages called spikes sent on a generating neuron's axon to the dendrites of receiving neurons. The point of contact between an axon and dendrite is called the synapse, which has a particular strength that determines the efficacy of a spike from a source pre-synaptic neuron, on a target post-synaptic neuron.

A neuromorphic (or cognitive) computing system mimics the processing of the brain for specific applications. A neuromorphic computing system is probabilistic in that it generates not just answers to numerical problems, but hypotheses, reasoned arguments and recommendations about more complex—and meaningful—bodies of data. Similar to the brain, a neuromorphic computing system is comprised of a large scale network of neuron (processing) devices and adaptive synapse (memory) devices. The neuron device has two main functions. The first main function is to take input from connected synapse devices. If the input is above a predetermined input threshold, the neuron device generates a spike-like output signal that is processed as part of the larger network of neuron devices that then makes some computational decision. This process is referred to as spike-timing dependent plasticity (STDP). The second main function of the neuron device is to change the state of one or more connected synapse devices, where each synapse device in this case functions as a memory device.

Neuron and synapse devices have been implemented on an integrated circuit known as a neurosynaptic chip. In one known implementation, the synapse devices are silicon-based devices such as transposable 8-transistor cell static random access memory (8-T SRAM) devices connected in a crossbar array. Other implementations include magnetic RAM (MRAM) or phase change memory (PCM). Neurosynaptic chips are key building blocks of a modular neuromorphic architecture.

SUMMARY

Embodiments provide techniques for a three-dimensional (3-D) integration of neurosynaptic chips. For example, in one embodiment, a method comprises forming one or more neuron layers each comprising a plurality of processing devices, forming on top of the one or more neuron layers one or more synapse layers each comprising an array of memory devices, and forming a plurality of staggered through-silicon vias (TSVs) connecting the one or more neuron layers to the one or more synapse layers wherein the plurality of staggered TSVs operate as communication links between one or more processing devices in the one or more neuron layers and one or more memory devices in the one or more synapse layers.

DETAILED DESCRIPTION

Figure 1:
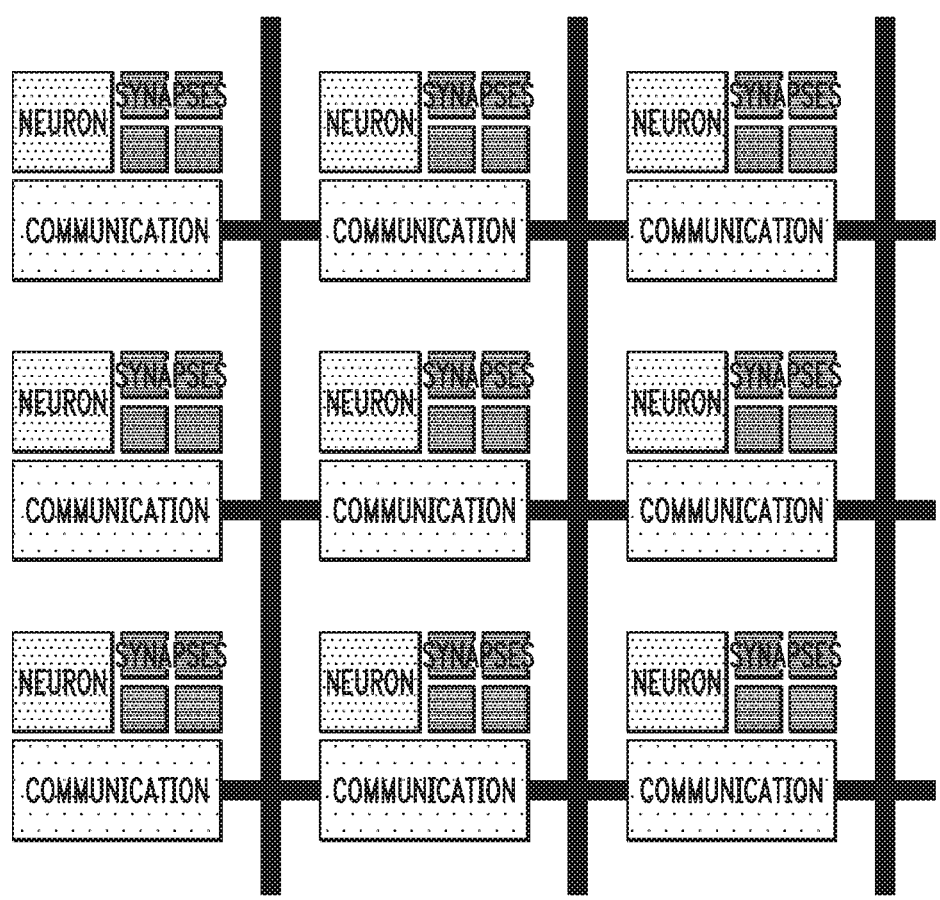
FIG. 1 is an architectural abstraction of a network of neurosynaptic cores.

Embodiments of the present invention relate to neurosynaptic chips, and in particular, to techniques for a three-dimensional (3-D) integration of neurosynaptic chips. Further, embodiments of the present invention provide a scalable, 3-D neurosynaptic architecture for neural network circuits. It is to be understood that the various layers, structures, and/or regions shown in the accompanying drawings are schematic illustrations that are not necessarily drawn to scale. In addition, for ease of explanation, one or more layers, structures, and regions of a type commonly used to form circuit devices or structures may not be explicitly shown in a given drawing. This does not imply that any layers, structures, and regions not explicitly shown are omitted from the actual circuit structures.

Moreover, the same or similar reference numbers are used throughout the drawings to denote the same or similar features, elements, layers, regions, or structures, and thus, a detailed explanation of the same or similar features, elements, layers, regions, or structures will not be repeated for each of the drawings. It is to be understood that the terms "about" or "substantially" as used herein with regard to thicknesses, widths, percentages, rangers, etc., are meant to denote being close or approximate to, but not exactly. For example, the term "about" or "substantially" as used herein implies that a small margin of error is present, such as 1% or less than the stated amount. Also, in the figures, the illustrated scale of one layer, structure, and/or region relative to another layer, structure, and/or region is not necessarily intended to represent actual scale.

A growing interest in the cognitive computing research is to develop electronic neuromorphic machine technology that scales to biological levels. As such, there is an increasing interest in using neurosynaptic chips as building blocks for cognitive systems. Current state of the art in neurosynaptic chips includes, for example, a neurosynaptic core with 256 digital integrate-and-fire neurons and a 1024×256 bit static random-access memory (SRAM) cross bar memory for synapses using IBM's 45 nm Silicon-on-Insulator (SOI) process and a Phase Change Memory (PCM) based synapse in ultra-dense large scale neuromorphic system in which different chalcogenide materials were characterized to demonstrate synaptic behavior. Even though the latest IBM neurosynaptic chip called TrueNorth incorporates 5.4 billion transistors and features 1 million programmable neurons and 256 million programmable synapses, it nevertheless comes short of fully mimicking an average adult human brain with 100 billion neurons and 100 trillion to 150 trillion synapses. Needless to say, the size of a synapse chip to accommodate for such features grows exponentially large.

Accordingly, embodiments of the present invention illustrate techniques for a 3-D integration/architecture for a synapse circuitry. Advantageously, such 3-D structure dramatically reduces the footprint of a synapse chip while increasing the number of axon connections between synapses and neurons. Moreover, a 3-D integration allows for a cell-fault tolerant structure and a heterogeneous integration of synapse chips (complementary metal-oxide semiconductor (CMOS) or non-volatile memory) and neuron chips.

Embodiments illustrating such advantages will be described in greater details below with reference to FIGS. 2A-3B.

Referring now to FIG. 1, an architectural abstraction of a network of neurosynaptic cores is illustrated that can implement large-scale spiking neural networks that are efficient, scalable, and flexible. FIG. 1 is a conceptual blueprint of an architecture that, like the brain, tightly integrates memory, computation, and communication in distributed modules that operate in parallel and communicate via an event-driven network.

Figure 2A:
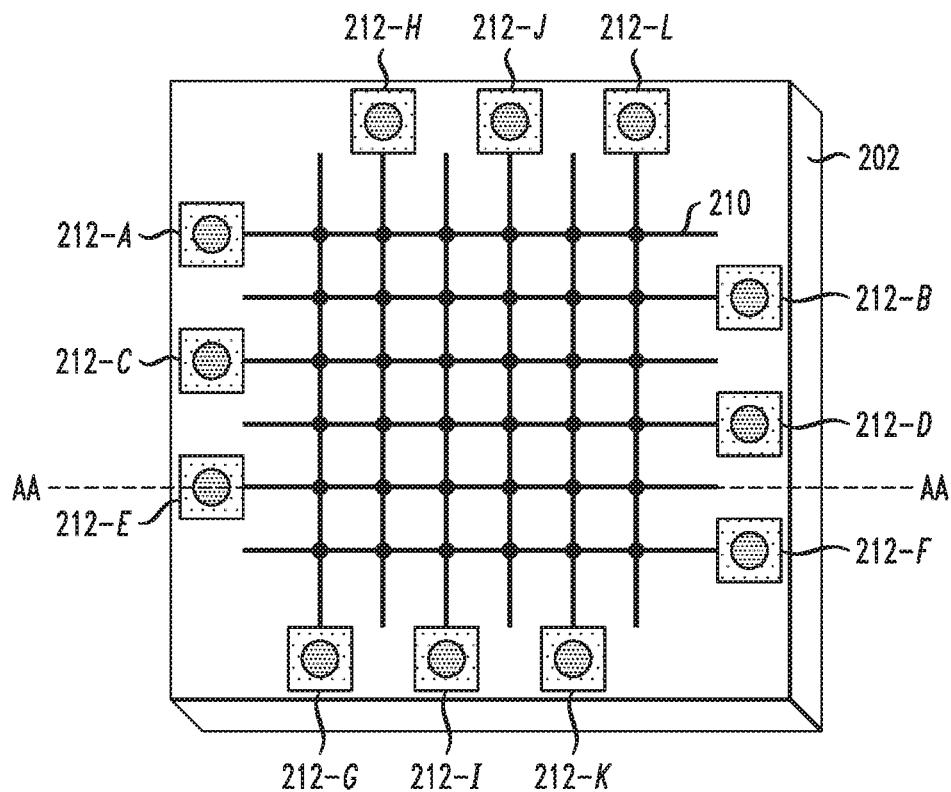
FIG. 2A is a schematic top-down view of a synapse layer comprising an array of memory devices, according to a first embodiment of the invention.

FIG. 2A depicts a top-down view of a neurosynaptic circuit structure in accordance with a first embodiment of the invention. For example, a structure 200 comprises a neuron layer 202. The neuron layer 202 comprises a plurality of neurons (processing devices, not shown in FIG. 2A) and the plurality of neurons may be distributed within the neuron layer 202 using any conventional configuration such as, for example, an N by N array. A neuron may comprise, for example, any conventional processing or computing device known in the art, which may vary in size, functionality and/or capability. In some embodiments, a neurosynaptic circuit structure may comprise a plurality of neuron layers and each of the plurality of neuron layers may comprise respective plurality of neurons distributed in N by N arrays.

The structure 200 further comprises a synapse layer 210. The synapse layer 210 comprises an array of synapses (memory devices). A synapse may comprise, for example, any conventional memory device known in the art, such as PCM, resistive random-access memory (RRAM) or CMOS memory devices. In an embodiment, a neurosynaptic circuit structure may comprise a plurality of synapse layers and each of the plurality of synapse layers may comprise a respective array of synapses. In such embodiment, each synapse layer may comprise a synapse array that vary in size. For example, a synapse layer may comprise a 5 by 5 synapse array while another synapse layer may comprise a 6 by 6 synapse array. Moreover, each synapse array may comprise the same or different ones of PCM, RRAM or CMOS memory devices. In an alternative embodiment, a synapse layer may comprise a plurality of synapse arrays.

Each of the rows and columns of a synapse array in any given synapse layer extends past the synapses and connects to one or more through-silicon vias (TSVs) arising orthogonally from a neuron layer. For example, in the structure 200, the synapse layer 210 comprises a 6 by 6 array of synapses and each row and column of the array connects to respective TSVs (TSV 212-A through TSV 212-L) arising orthogonally from the neuron layer 202.

In accordance with an embodiment, TSVs are arranged in a staggered manner. "Staggered TSVs" as used herein, may refer to a plurality of TSVs that are arranged in a zigzag order or in an alternating manner on either side of a center. For example, in the structure 200, the TSVs 212-A through 212-F are connected to each row of the array in a left-right staggered manner and likewise, the TSVs 212-G through 212-L are connected to each column of the array in a down-up staggered manner. Thus, the TSVs 212-A through 212-L may collectively be referred to as a plurality of staggered TSVs.

Figure 2B:
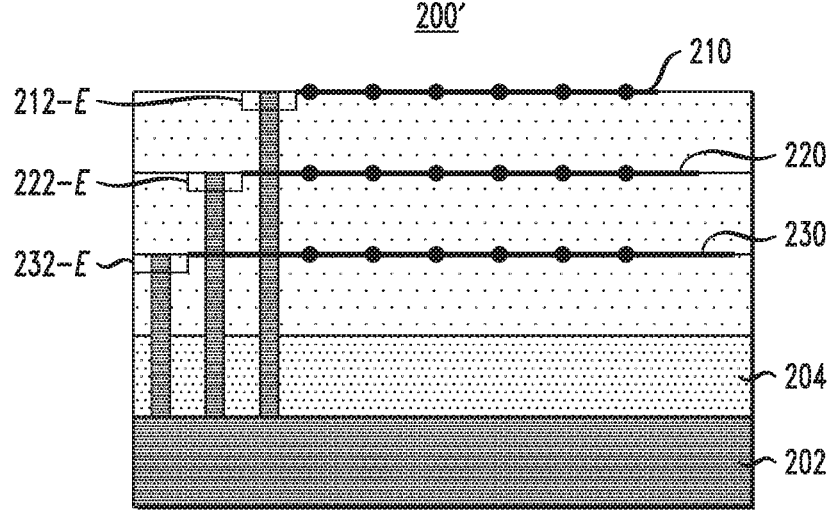
FIG. 2B is a schematic cross-sectional side view of a 3-D synapse structure comprising the synapse layer of FIG. 2A, according to a first embodiment of the invention.

Referring now to FIG. 2B, a structure 200' depicts a cross-sectional side view of the structure 200 of FIG. 2A along the AA axis. FIG. 2B illustrates the structure 200' comprising the neuron layer 202 and the synapse layer 210. FIG. 2B further illustrates the structure 200' comprising two additional synapse layers below the synapse layer 210 (referred to as synapse layer 220 and synapse layer 230), which were not shown in FIG. 2A. Both synapse layers 220 and 230 comprise respective arrays of synapses.

FIG. 2B further illustrates the structure 200' comprising the TSV 212-E. It should be noted that the TSVs 212-C and 212-A as shown in FIG. 2A are hidden in FIG. 2B as they are directly behind the TSV 212-E in FIG. 2B perspective. FIG. 2B further omits from showing the TSVs 212-G, 212-H, 212-I, 212-J, 212-K, 212-L, 212-F, 212-D and 212-B solely for the sake of simplicity of the figure. FIG. 2B further illustrates the structure 200' comprising additional TSVs 222-E and 232-E. The TSV 222-E rises orthogonally from the neuron layer 202 and connects to the synapse layer 220 while the TSV 232-E rises orthogonally from the neuron layer 202 and connects to the synapse layer 230. It should also be noted that the TSV 222-E is part of a plurality of staggered TSVs (222-A through 222-L, not shown in FIG. 2B) connected to each row and column of the synapse array in the synapse layer 220 and the TSV 232-E is part of a plurality of staggered TSVs (232-A through 232-L, not shown in FIG. 2B) connected to each row and column of the synapse array in the synapse layer 230.

It is important to note that in FIG. 2B, the TSVs 212-E, 222-E and 232-E are vertically staggered. "Staggered TSVs" as used herein, may also refer to a plurality of TSVs that are horizontally offset from another plurality of TSVs. Furthermore, "staggered TSVs" as used herein, may refer to a set of horizontally offset TSVs having staggering vertical heights. For example, a first plurality of staggered TSVs (212-A through 212-L), a second plurality of staggered TSVs (222-A through 222-L) and a third plurality of staggered TSVs (232-A through 232-L) each have staggered vertical heights to reach respective synapse layers.

Lastly, FIG. 2B illustrates the structure 200' comprising a redistribution layer 204 placed directly above the neuron layer 202. The redistribution layer 204 may operate as a routing layer to control selective coupling of one or more TSVs to the one or more of the neurons distributed in the neuron layer 202.

As illustrated in both FIGS. 2A and 2B, pluralities of staggered TSVs are placed in an outer perimeter of the neuron layer 202. In some embodiments, it may be preferred to place a plurality of staggered TSVs connecting to the lowest synapse layer in the outermost perimeter of a neuron layer and to place a plurality of staggered TSVs connecting to the highest synapse layer in the innermost perimeter of a neuron layer. Such configuration allows for efficient tradeoff between horizontal and vertical travel time. However, such illustration is not intended to limit the scope of the invention in any way. In alternative embodiments, a synapse layer may comprise a plurality of synapse arrays and TSVs are not only distributed in outer perimeters of the arrays but also through and in between one or more synapse arrays in the given synapse layer.

Any of the embodiments described above may in its entirety be stacked on top of each other. For example, an additional set of neuron layer, redistribution layer, synapse layer and TSVs may be stacked on top of the structure 200' as shown in FIG. 2B. In such structure, TSVs rising from a given neuron layer also extend to one or more neuron layers stacked on top and operate as communication links between one or more computing devices in any one of the neuron layers and one or more memory devices in any one of the synapse layers.

In any of the embodiments described above, an array for synapses need not be a square array of size N×N. For example, a plurality of synapses may be distributed within a synapse layer in an array of size N×M wherein N>M.

In some embodiments, a neuron layer may comprise a larger dimensional area than any one of the synapse layers stacked thereon. For example, a neuron layer may comprise a dimension of 20 mm×20 mm and a plurality of synapse layers may each comprise a dimension of 19 mm×19 mm. In such embodiments, the plurality of synapse layers may be concentrically stacked on the neuron layer and a plurality of TSVs may extend orthogonally from the neuron layer at an outer perimeter of the neuron layer enclosing the plurality of synapse layers. Exemplary embodiments of such configuration are shown in FIGS. 2A and 2B.

It is to be noted that any of the above examples with regard to the number and size of the arrays or the number of neurons or synapses contained therein, are exemplary only. Furthermore, any of the above examples with regard to the number, shape, arrangement or distribution of the TSVs are exemplary only and are not intended to limit the scope of the invention in any way.

In any of the disclosed embodiments of the present invention, heterogeneous integration of synapse layers may be achieved. For example, in a given plurality of synapse layers, a first layer may comprise an array of PCM devices while a second layer may comprise an array of RRAM devices. A synapse layer may comprise an array of memory devices comprising one or more of PCM, RRAM or CMOS memory devices. Moreover, in any of the disclosed embodiments, TSVs can be made of tungsten, copper or any other suitable materials. For example, 3-D bonding may be achieved by Cu—Cu bonding, polymer bonding, oxide bonding, or hybrid bonding. For high density 3-D integration structures, oxide bonding is preferred.

As an exemplary illustration, a conventional 2-D synapse chip may comprise 256 neuron devices with 1024 axon connections totaling in 1024×256 synapse devices. The synapse devices may be distributed in an array of size 1024×256 wherein 1024 rows correspond to each axon connections and 256 columns correspond to each neurons devices. Unlike a conventional 2-D synapse chip, an embodiment of the present invention comprises a neuron layer comprising 256 neuron devices. On top of the neuron layer, stacking 4 synapse layers each layer comprising synapse devices in an array of size 256×256 would accommodate the same number of synapse devices in a significantly reduced area. For example, the base size of a 3-D structure may simply be the size of the neuron layer which only needs to be, about the same size as the synapse devices. Alternatively, stacking 16 synapse layers each comprising synapse devices in an array of size 128×128 would also accommodate the same number of synapse devices in an even smaller area. The footprint of a synapse chip is therefore reduced dramatically by the 3-D integration structure. Furthermore, without requiring more dimensional area, stacking more synapse layers can result in more axon connections between more neuron devices and more synapse devices.

Figure 3A:
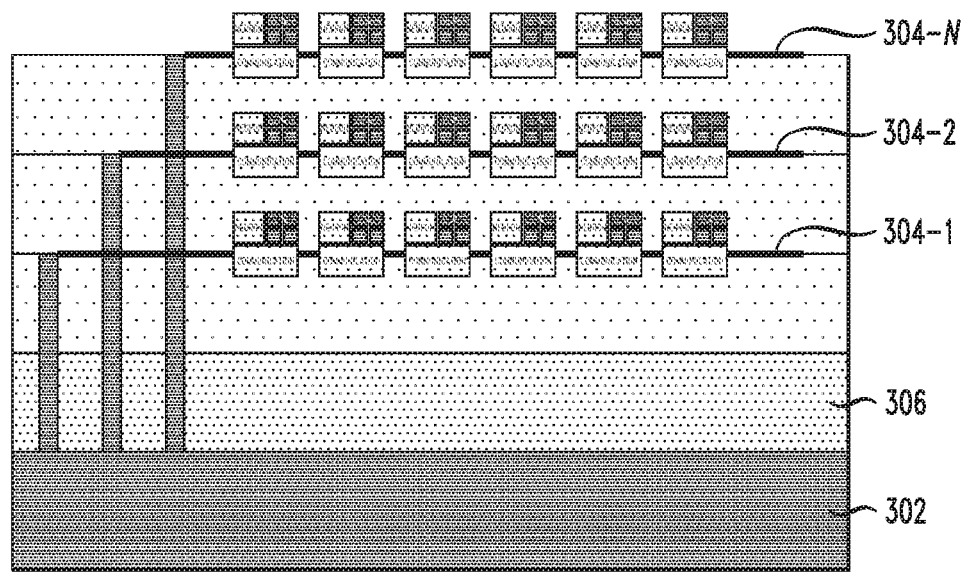
FIG. 3A is a schematic cross-sectional side view of a 3-D synapse structure, according to a second embodiment of the invention.

In accordance with a second embodiment, FIG. 3A depicts a cross-sectional side view of a structure 300 wherein, unlike the structure 200' shown in FIG. 2B, a neuron layer is replaced with a synapse chip core layer 302. Moreover, instead of stacking a plurality of synapse layers each comprising an array of synapses as shown in FIG. 2B, the structure 300 illustrates stacking a plurality of paralleled synapse circuit layers 304-1, 304-2, . . . 304-N (collectively referred to as paralleled synapse circuit layers 304). Similar to the structures shown in reference to FIGS. 2A and 2B, the synapse chip core layer 302 is operatively configured to communicate with each paralleled synapse circuit layer via a plurality of staggered TSVs. The structure 300 further comprises a redistribution layer 306. The redistribution layer 306 may operate as a routing layer to route some point at the synapse chip core layer 302 to a location in certain paralleled synapse circuit layer 304.

Figure 3B:
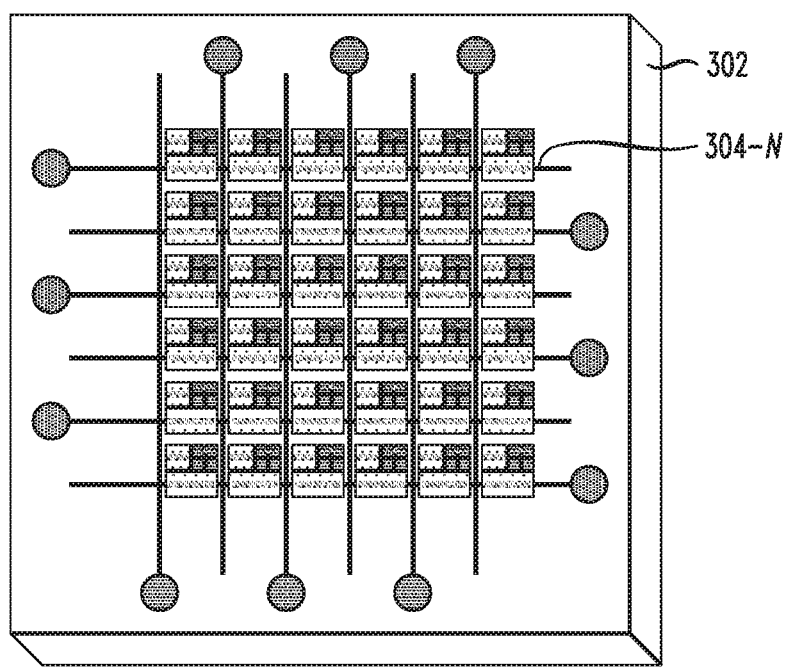
FIG. 3B is a schematic top-down view of a synapse circuit layer, according to a second embodiment of the invention.

Referring now to FIG. 3B, TSVs as shown in structure 300' are configured and operative in substantially similar manner to the first embodiment as disclosed above in reference to FIGS. 2A and 2B. Furthermore, techniques for stacking a plurality of paralleled synapse circuit layers on top of the synapse chip core layer as well as stacking a plurality of synapse chip core layers each comprising corresponding plurality of paralleled synapse circuit layers are substantially similar to the techniques disclosed above in reference to the first embodiment. Thus, disclosures as to specific arrangements and configurations are omitted for economy of description.

Although illustrative embodiments have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
    forming one or more neuron layers comprising a plurality of computing elements;
    forming on top of one of the one or more neuron layers a plurality of synapse layers stacked thereon each layer comprising an array of memory elements, wherein the array comprises a plurality of rows and a plurality of columns; and
    forming a plurality of staggered through-silicon vias (TSVs), wherein each of the staggered TSVs connects the one neuron layer to a respective one of the plurality of synapse layers, wherein each of the staggered TSVs are configured to be orthogonal to the one neuron layer, wherein a first set of the plurality of TSVs are horizontally offset from a second set of the plurality of TSVs and a third set of the plurality of TSVs, wherein a portion of the horizontally offset TSVs each have staggering vertical heights, and further wherein a portion of each of the first set of the plurality of TSVs, the second set of the plurality of TSVs and the third set of the plurality of TSVs are connected to each row of the array of the respective synapse layer in a left-right staggered manner and another portion of each of the first set of the plurality of TSVs, the second set of the plurality of TSVs and the third set of the plurality of TSVs are connected to each column of the array of the respective synapse layer in a down-up staggered manner;
    wherein the plurality of staggered TSVs operate as communication links between one or more computing elements in the one or more neuron layers and one or more memory elements in the plurality of synapse layers.

2. The method of claim 1, wherein the plurality of staggered TSVs are formed in an outer perimeter of the plurality of synapse layers.

3. The method of claim 2, wherein the plurality of staggered TSVs are formed in the outside perimeter in a zigzag manner wherein alternating rows and columns of the array of memory elements are connected to the TSVs in respective opposite sides.

4. The method of claim 1, wherein at least one of the synapse layers comprise a plurality of arrays of memory elements wherein the plurality of staggered TSVs are formed in an outer perimeter and through and between each of the plurality of arrays of memory elements.

5. The method of claim 1, further comprising forming a plurality of staggered TSVs wherein each plurality of staggered TSVs connect to a respective synapse layer, and wherein each plurality of staggered TSVs are vertically staggered.

6. The method of claim 1, wherein two or more of the synapse layers are heterogeneous synapse layers wherein at least one synapse layer comprises an array of memory elements comprising a first type of memory elements from one of phase-change memory (PCM) elements, resistive random-access memory (RRAM) elements and complementary metal-oxide semiconductor (CMOS) memory elements, and at least one other synapse layer comprises an array of memory elements comprising a second type of memory elements from one of PCM elements, RRAM elements and CMOS memory elements different than the first type of memory elements.

7. The method of claim 1, wherein the array of memory elements is a heterogeneous array of memory elements comprising two or more of phase-change memory (PCM) elements, resistive random-access memory (RRAM) elements and complementary metal-oxide semiconductor (CMOS) memory elements.

8. The method of claim 1, further comprising forming a redistribution layer on top of the one or more neuron layers wherein in the redistribution layer, the plurality of staggered TSVs are selectively coupled to the one or more computing elements of the one or more neuron layers.

9. The method of claim 1, further comprising repeating the forming steps to form a plurality of one or more neuron layers and the plurality of one or more neuron layers each comprising a respective set of one or more synapse layers each comprising an array of memory elements wherein the plurality of staggered TSVs operate as communication links between one or more computing elements in any one of the neuron layers and one or more memory elements in any one of the synapse layers.

10. An apparatus, comprising:
one or more neuron layers each comprising a plurality of computing elements;
a plurality of synapse layers stacked on top of one of the one or more neuron layers wherein each of the plurality of synapse layers comprises an array of memory elements, wherein the array comprises a plurality of rows and a plurality of columns; and
a plurality of staggered through-silicon vias (TSVs) each connecting the one neuron layer to a respective one of the plurality of synapse layers, wherein each of the staggered TSVs are configured to be orthogonal to the one neuron layer, wherein a first set of the plurality of TSVs are horizontally offset from a second set of the plurality of TSVs and a third set of the plurality of TSVs, wherein a portion of the horizontally offset TSVs each have staggering vertical heights, and further wherein a portion of each of the first set of the plurality of TSVs, the second set of the plurality of TSVs and the third set of the plurality of TSVs are connected to each row of the array of the respective synapse layer in a left-right staggered manner and another portion of each of the first set of the plurality of TSVs, the second set of the plurality of TSVs and the third set of the plurality of TSVs are connected to each column of the array of the respective synapse layer in a down-up staggered manner;
wherein the plurality of staggered TSVs operate as communication links between one or more computing elements in the one or more neuron layers and one or more memory elements in the plurality of synapse layers.

11. The apparatus of claim 10, wherein the plurality of staggered TSVs are formed in an outer perimeter of the one or more synapse layers.

12. The apparatus of claim 11, wherein the plurality of staggered TSVs are formed in the outside perimeter in a zigzag manner wherein alternating rows and columns of the array of memory elements are connected to the TSVs in respective opposite sides.

13. The apparatus of claim 10, wherein at least one of the synapse layers comprise a plurality of arrays of memory elements wherein the plurality of TSVs are staggered in outer perimeters of each of the plurality of arrays of memory elements.

14. The apparatus of claim 10, further comprising a plurality of staggered TSVs wherein each plurality of staggered TSVs connect to a respective synapse layer, and wherein each plurality of staggered TSVs are vertically staggered.

15. The apparatus of claim 10, wherein two or more of the synapse layers are heterogeneous synapse layers wherein at least one synapse layer comprises an array of memory elements comprising a first type of memory elements from one of phase-change memory (PCM) elements, resistive random-access memory (RRAM) elements and complementary metal-oxide semiconductor (CMOS) memory elements, and at least one other synapse layer comprises an array of memory elements comprising a second type of memory elements from one of PCM elements, RRAM elements and CMOS memory elements different than the first type of memory elements.

16. The apparatus of claim 10, wherein the array of memory elements is a heterogeneous array of memory elements comprising two or more of phase-change memory (PCM) elements, resistive random-access memory (RRAM) elements and complementary metal-oxide semiconductor (CMOS) memory elements.

17. The apparatus of claim 10, further comprising a redistribution layer formed on top of the one or more neuron layers wherein in the redistribution layer, the plurality of TSVs are selectively coupled to one or more computing elements of the one or more neuron layers.

18. The apparatus of claim 10, further comprising a plurality of one or more neuron layers and the plurality of one or more neuron layers each comprising a respective set of one or more synapse layers each comprising an array of memory elements wherein the plurality of staggered TSVs operate as communication links between one or more computing elements in any one of the neuron layers and one or more memory elements in any one of the synapse layers.

19. A method comprising:
forming a synapse chip core layer;
forming on top of the synapse chip core layer a plurality of paralleled synapse circuit layers wherein each of the a plurality of paralleled synapse circuit layers comprises an array of synapse circuits, wherein the array comprises a plurality of rows and a plurality of columns; and
forming a plurality of staggered through-silicon vias (TSVs) connecting each of the paralleled synapse circuit layers to the synapse chip core layer, wherein a first set of the plurality of TSVs are horizontally offset from a second set of the plurality of TSVs and a third set of the plurality of TSVs, wherein a portion of the horizontally offset TSVs each have staggering vertical heights, and further wherein a portion of each of the first set of the plurality of TSVs, the second set of the plurality of TSVs and the third set of the plurality of TSVs are connected to each row of the array of a respective paralleled synapse circuit layers in a left-right staggered manner and another portion of each of the first set of the plurality of TSVs, the second set of the plurality of TSVs and the third set of the plurality of TSVs are connected to each column of the array of the respective paralleled synapse circuit layers in a down-up staggered manner;

wherein the plurality of staggered TSVs operate as communication links between the synapse chip core layer and each of the one or more paralleled synapse circuit layers.

20. An integrated circuit formed via the steps of claim 19.

* * * * *